United States Patent
Oikawa et al.

(10) Patent No.: US 6,846,581 B2
(45) Date of Patent: Jan. 25, 2005

(54) PERPENDICULAR MAGNETIC RECORDING MEDIUM AND MAGNETIC RECORDING-REPRODUCING APPARATUS USING THE SAME

(75) Inventors: Soichi Oikawa, Yokohama (JP); Yoichiro Tanaka, Kawasaki (JP); Takashi Hikosaka, Tokyo (JP); Futoshi Nakamura, Yamato (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 23 days.

(21) Appl. No.: 10/101,949

(22) Filed: Mar. 21, 2002

(65) Prior Publication Data

US 2002/0136930 A1 Sep. 26, 2002

(30) Foreign Application Priority Data

Mar. 22, 2001 (JP) ........................................ 2001-083668

(51) Int. Cl.⁷ ............................................... B32B 19/00
(52) U.S. Cl. ................ 428/692; 428/693; 428/694 TM; 360/105; 360/324
(58) Field of Search ................................. 428/692, 693, 428/694 TM; 360/105, 324

(56) References Cited

U.S. PATENT DOCUMENTS

| 4,621,030 A | 11/1986 | Uesaka et al. | |
| 5,700,594 A | 12/1997 | Jeffers | |
| 5,738,938 A | * 4/1998 | Kawano et al. | 428/332 |
| 5,792,564 A | 8/1998 | Hikosaka et al. | |
| 5,815,342 A | 9/1998 | Akiyama et al. | |
| 5,942,342 A | 8/1999 | Hikosaka et al. | |
| 6,120,890 A | 9/2000 | Chen et al. | |
| 2002/0044393 A1 | * 4/2002 | Seigler et al. | 360/324 |
| 2002/0181173 A1 | * 12/2002 | Nagai | 360/324.12 |

FOREIGN PATENT DOCUMENTS

| JP | 3-53686 | 8/1991 |
| JP | 5-258274 | 10/1993 |
| JP | 6-28652 | 2/1994 |
| JP | 11144229 A | 5/1999 |

* cited by examiner

*Primary Examiner*—Deborah Jones
*Assistant Examiner*—Vivek Koppikar
(74) *Attorney, Agent, or Firm*—Pillsbury Winthrop LLP

(57) ABSTRACT

Disclosed is a perpendicular magnetic recording medium, comprising a nonmagnetic substrate, a longitudinal hard magnetic multi-layered film arranged on the nonmagnetic substrate, including a nonmagnetic intermediate layer and a pair of hard magnetic layers laminated one upon the other with the nonmagnetic intermediate layer interposed therebetween, and having at least two hard magnetic layers, a longitudinal soft magnetic layer formed on the longitudinal hard magnetic multi-layered film, and a perpendicular magnetic recording layer formed on the longitudinal soft magnetic layer. The perpendicular magnetic recording medium of the particular construction is capable of suppressing noise and achieves a high recording magnetic field intensity and a high recording resolution.

28 Claims, 4 Drawing Sheets

PERPENDICULAR MAGNETIC RECORDING MEDIUM AND MAGNETIC RECORDING-REPRODUCING APPARATUS USING THE SAME

CROSS-REFERENCE TO RELATED APPLICATIONS

This application is based upon and claims the benefit of priority from the prior Japanese Patent Application No. 13-083668, filed Mar. 22, 2001, the entire contents of which are incorporated herein by reference.

BACKGROUND OF THE INVENTION

1. Field of the Invention

The present invention relates to a perpendicular magnetic recording medium comprising a magnetic recording layer and a soft magnetic layer and adapted for a high-density magnetic recording and to a magnetic recording-reproducing apparatus using the particular perpendicular magnetic recording medium.

2. Description of the Related Art

In a perpendicular double-layer medium formed by laminating a perpendicular recording layer on a soft magnetic layer having a high permeability, the soft magnetic layer plays the role of a part of the function of the magnetic head such that the recording magnetic field that has been generated from the magnetic head and that has magnetized the perpendicular recording layer is passed in a horizontal direction and be brought back to the side of the magnetic head, thereby improving the recording-reproducing efficiency. On the other hand, the soft magnetic layer tends to form domains for decreasing the magnetostatic energy, and domain walls are formed at the boundaries between the adjacent domains. It is known in the art that a spike-like noise is generated at the site where the domain wall is present. The spike-like noise can be suppressed by suppressing the formation of the domain walls in the soft magnetic layer. Some methods for suppressing the domain wall formation are proposed in, for example, Jpn. Pat. Appln. KOKOKU Publication No. 3-53686 and Jpn. Pat. Appln. KOKAI Publication No. 5-258274. It is proposed that a hard magnetic layer or an antiferromagnetic layer is formed above or below a soft magnetic layer so as to fix the direction of the easy magnetization of the soft magnetic layer to the radial direction for suppressing the formation of the domain wall in the soft magnetic layer.

In view of the control of the direction of the easy magnetization of the soft magnetic layer, it is convenient to use a hard magnetic layer that permits easily controlling the direction of magnetization of the hard magnetic layer itself. Where a hard magnetic layer is formed below the soft magnetic layer, the hard magnetic layer is far from the magnetic head enough so as to inhibit the writing of the information magnetization. However, the hard magnetic layer is basically equal to the longitudinal magnetic recording medium in the material and the magnetic characteristics, and therefore provide a source of medium noise. Also, it is desirable for the soft magnetic layer to be thin in view of the manufacturing cost and the dust generation during the film forming process. However, the noise from the hard magnetic layer is increased if the soft magnetic layer is made thinner and the distance between the hard magnetic layer and the magnetic head is decreased. It follows that the use of a hard magnetic layer generates a problem particular where the soft magnetic layer is made thinner.

On the other hand, the use of an antiferromagnetic layer is advantageous over the use of a hard magnetic layer in view that a noise is not generated because magnetization does not take place. However, since the antiferromagnetic layer does not have a macroscopic magnetization unlike the hard magnetic layer, it is difficult to control directly the direction of the magnetic spin of the antiferromagnetic layer. Therefore, in order to fix the direction of the magnetization of the soft magnetic layer to the radial direction, a soft magnetic layer is formed first, followed by forming an antiferromagnetic layer on the soft magnetic layer with a magnetic field applied in the radial direction, as disclosed in Japanese Patent Publication No. 3-53686 referred to above. However, where an antiferromagnetic layer is laminated on a soft magnetic layer as proposed in the Japanese patent document quoted above, the distance between the soft magnetic layer and the magnetic head is increased because of the presence of the antiferromagnetic layer and therefore give rise to the problem that the recording magnetic field generated from the magnetic head tends to be diffused so as to lower the recording magnetic field intensity and the recording resolution.

As described above, in the conventional perpendicular double-layer medium comprising a soft magnetic layer and a perpendicular recording layer laminated on the soft magnetic layer, the spike-like noise was suppressed by magnetizing the soft magnetic layer in the radial direction by using a hard magnetic layer or an antiferromagnetic layer. However, the use of the hard magnetic layer gives rise to the problem that noise is generated from the hard magnetic layer itself. On the other hand, in the case of using an antiferromagnetic layer, it is difficult to control the direction of the magnetization. Also, an additional problem is located in that the distance between the magnetic head and the soft magnetic layer is increased.

BRIEF SUMMARY OF THE INVENTION

An object of the present invention, which has been achieved in view of the situation described above, is to provide a perpendicular magnetic recording medium capable of suppressing the medium noise and also capable of obtaining a high recording magnetic field intensity and a high recording resolution.

According to a first aspect of the present invention, there is provided a perpendicular magnetic recording medium, comprising:

a nonmagnetic substrate;

a longitudinal hard magnetic multi-layered film arranged on the nonmagnetic substrate, including at least two hard magnetic layers laminated one upon the other with a nonmagnetic intermediate layer interposed therebetween;

a longitudinal soft magnetic layer formed on the longitudinal hard magnetic multi-layered film; and a perpendicular magnetic recording layer formed on the longitudinal soft magnetic layer.

According to a second aspect of the present invention, there is provided a magnetic recording-reproducing apparatus, comprising:

a perpendicular magnetic recording-reproducing medium;

driving mechanism to support and rotate the perpendicular magnetic recording-reproducing medium;

a magnetic head equipped with an element to record information in the perpendicular magnetic recording medium and with an element serving to reproduce the recorded information; and a carriage assembly which supports the magnetic head such that the magnetic head is movable relative to the perpendicular magnetic recording medium;

wherein the perpendicular magnetic recording medium comprises:
- a nonmagnetic substrate;
- a longitudinal hard magnetic multi-layered film arranged on the nonmagnetic substrate, including at least two hard magnetic layers laminated one upon the other with a nonmagnetic intermediate layer interposed therebetween;
- a longitudinal soft magnetic layer formed on the longitudinal hard magnetic multi-layered film; and
- a perpendicular magnetic recording layer formed on the longitudinal soft magnetic layer.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention, and together with the general description given above and the detailed description of the embodiments given below, serve to explain the principles of the present invention.

DETAILED DESCRIPTION OF THE INVENTION

The perpendicular magnetic recording medium of the present invention comprises a structure in which a nonmagnetic substrate, a longitudinal hard magnetic multi-layered film are laminated in the order, a longitudinal soft magnetic layer and a perpendicular magnetic recording layer. The longitudinal hard magnetic multi-layered film includes at least, a nonmagnetic intermediate layer and two hard magnetic layers which are laminated one hard magnetic layer upon the other hard magnetic layer with a nonmagnetic intermediate layer interposed therebetween respectively.

The magnetic recording-reproducing apparatus of the present invention is an apparatus having the above-noted perpendicular magnetic recording medium incorporated therein. Specifically, the magnetic recording-reproducing apparatus of the present invention comprises the perpendicular magnetic recording medium, driving mechanism to support and rotate the perpendicular magnetic recording medium, an element to record information in the perpendicular magnetic recording medium, a magnetic head to reproduce the recorded information, and a carriage assembly which supports the magnetic head such that the magnetic head is movable relative to the perpendicular magnetic recording medium.

In the perpendicular magnetic recording medium of the present invention, the longitudinal hard magnetic layer arranged below the longitudinal soft magnetic layer is of a multi-layered structure prepared by alternately laminating hard magnetic layers and nonmagnetic layers and produces the interaction of aligning the directions of the magnetization of the adjacent hard magnetic layers in an antiparallel fashion. Because of the particular function, the present invention makes it possible to suppress the leakage of the magnetic flux from the hard magnetic layer and to improve the problem of the noise generation from the hard magnetic layer without increasing the distance between the magnetic head and the longitudinal soft magnetic layer.

Also, in the present invention, the hard magnetic layer included in the longitudinal hard magnetic multi-layered film can be magnetized easily in an optional direction so as to make it possible to suppress relatively easily the spike-like noise generation from the longitudinal soft magnetic layer.

Figure 1:
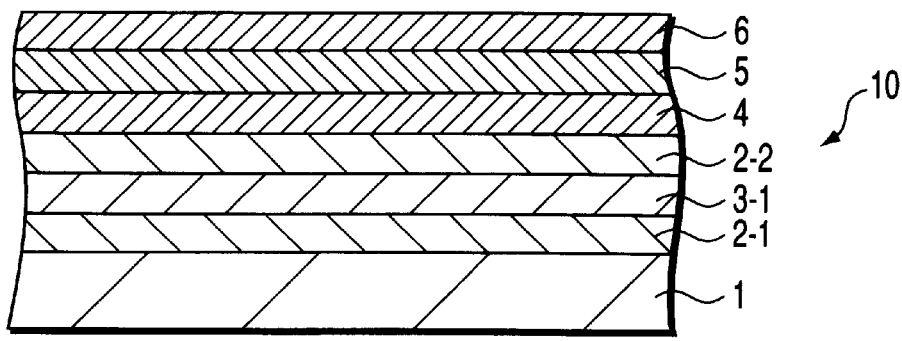
FIG. 1 is a cross-sectional view exemplifying the constitution of a magnetic recording medium of the present invention.

FIG. 1 is a cross-sectional view exemplifying the construction of an example of a magnetic recording medium 10 of the present invention. As shown in the drawing, the magnetic recording medium 10 comprises a substrate 1, a longitudinal hard magnetic layer 8 formed on the substrate 1 and consisting of a first magnetic layer 2-1, a nonmagnetic layer 3-1, a second magnetic layer 2-2, which are laminated one upon the other in the order mentioned, a longitudinal soft magnetic layer 4 formed on the longitudinal hard magnetic layer 8, an underlayer 5 formed on the longitudinal soft magnetic layer 4, and a perpendicular magnetic recording layer 6 formed on the underlayer 5.

In the present invention, a hard magnetic layer included in the longitudinal hard magnetic multi-layered film may be in contact with the longitudinal soft magnetic layer. As a result, the longitudinal soft magnetic layer is capable of achieving an exchange coupling with the longitudinal hard magnetic multi-layered film in the present invention. In order to magnetize the longitudinal soft magnetic layer in one direction by using the hard magnetic multi-layered film, the exchange coupling or an exchange interaction between the longitudinal soft magnetic layer and the hard magnetic layer in contact with the longitudinal soft magnetic layer is utilized. In practice, the exchange coupling or the exchange interaction produced between the atoms positioned adjacent to each other at the interface between the longitudinal soft magnetic layer and the hard magnetic layer is utilized for magnetizing the longitudinal soft magnetic layer in one direction. Since the exchange interaction is produced in the present invention between the longitudinal hard magnetic multi-layered film and the longitudinal soft magnetic layer, it is necessary for the layer included in the longitudinal hard magnetic multi-layered film, which is in contact with the longitudinal soft magnetic layer, to be a hard magnetic layer, not a nonmagnetic layer.

Also, in the present invention, it is desirable for the directions of magnetization of the hard magnetic layer included in the longitudinal hard magnetic multi-layered film, which is in contact with the longitudinal soft magnetic layer, to be aligned in a predetermined direction. Where the directions of the magnetization noted above are aligned, it is possible to suppress the spike-like noise.

Where the nonmagnetic substrate is in the shape of a disk, it is desirable for the hard magnetic layer in contact with the longitudinal soft magnetic layer to be magnetized in the circumferential direction or in the radial direction. More preferably, it is desirable to align the directions of magnetization of the hard magnetic layer in the radial direction.

Figure 2:
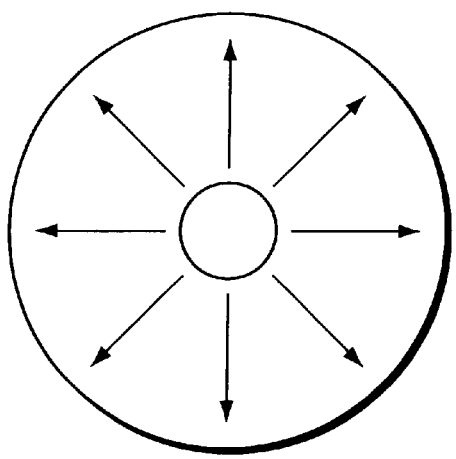
FIG. 2 shows as a model an example of the direction of the magnetization in the radial direction of a disk-like substrate.
Figure 3:
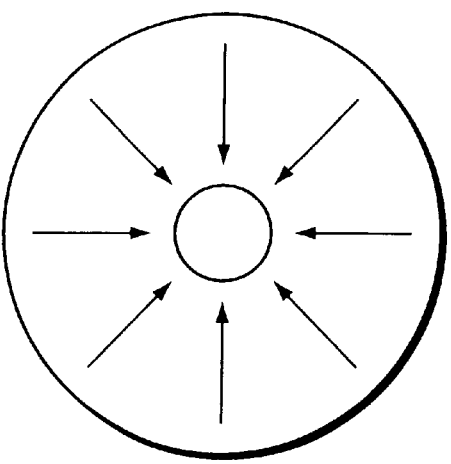
FIG. 3 shows as a model another example of the direction of the magnetization in the radial direction of a disk-like substrate.

Each of FIGS. 2 and 3 shows as a model that a disk-like substrate is magnetized in the radial direction. To be more specific, FIG. 2 shows that the disk-like substrate is radially magnetized from the center of the substrate toward the periphery of the substrate, as denoted by arrows. Also, FIG. 3 shows that the disk-like substrate is radially magnetized in the opposite direction from the periphery of the disk toward the center of the disk, as denoted by arrows. It is also possible for the disk-like substrate to be magnetized in the circumferential direction, i.e., in the clockwise or counter-clockwise direction.

In the present invention, it is desirable for the hard magnetic multi-layered film to align the directions of magnetization of the adjacent hard magnetic layers in an antiparallel direction. It is also desirable for the hard magnetic layers positioned adjacent to each other with a nonmagnetic layer interposed therebetween to have approximately the same magnitude of magnetic moment.

Where the two adjacent hard magnetic layers have the same magnitude of magnetic moment, the magnetic moments of the two adjacent hard magnetic layers are canceled by each other so as to minimize the leaking magnetic flux. It follows that, where the hard magnetic multi-layered film includes an even number of hard magnetic layers, it can be assumed that every two hard magnetic layers form a pair, with the result that the leaking magnetic flux of the entire hard magnetic layers can be minimized so as to improve the problem of noise generation most effectively.

If the difference in magnitude of the magnetic moments exceeds 0%, the two adjacent hard magnetic layers is larger, media noise from the multi layered hard magnetic layer tends to be larger.

A similar effect can be expected even if the longitudinal hard magnetic multi-layered film does not include an even number of the sum of the hard magnetic layers. For example, in the case of a disk-like substrate, a similar effect can be expected if the sum of the magnitudes of the magnetic moments of the hard magnetic layers that are magnetized radially outward is approximately equal to the sum of the magnitudes of the magnetic moments of the hard magnetic layers that are magnetized radially inward. In this case, it is desirable for the difference between the sum of the magnitudes of the magnetic moments of the hard magnetic layers that are magnetized radially outward and the sum of the magnitudes of the magnetic moments of the hard magnetic layers that are magnetized radially inward to be 0 or more 0 as possible. If the difference noted above, is larger, media noise from the multi layered hard magnetic layer tends to be larger.

Incidentally, if the construction that the directions of magnetization of the adjacent hard magnetic layers are aligned antiparallel to each other through the nonmagnetic layer is applied to the recording layer of the longitudinal magnetic recording medium, it is impossible to obtain a sufficient reproduction output. Thus the particular construction is convenient only for the perpendicular magnetic recording medium.

In the present invention, it is desirable for the coercive force of the hard magnetic layer adjacent to the longitudinal soft magnetic layer to be larger than the coercive force of the other hard magnetic layer.

In the absence of an external magnetic field, the soft magnetic layer and the hard magnetic layer are magnetized at random. Where an external magnetic field is applied for magnetizing the hard magnetic layer in a predetermined direction, particularly, in the case of applying an external magnetic field having an intensity high enough to overcome the interaction for aligning the hard magnetic layers in an antiparallel direction, each direction of the hard magnetic layers included in the hard magnetic multi-layered film faces in the direction of the external magnetic field so as to make the directions of magnetization parallel. If the external magnetic field is removed later, the direction of magnetization of one of the adjacent hard magnetic layers is reversed by the interaction, though the direction of magnetization of the other hard magnetic layer remains to be equal to the direction of the external magnetic field.

Where an even number of hard magnetic layers, e.g., two hard magnetic layers, are formed on a disk-like substrate and if an external magnetic field is applied to the disk-like substrate radially outward, followed by removing the external magnetic field, it is desirable for the direction of magnetization of one hard magnetic layer alone to be reversed so as to be magnetized radially inward. However, where the two hard magnetic layers are equal to each other in the magnetic characteristics, there is no reason for the preferential reversal in the direction of magnetization over the entire region of one hard magnetic layer alone. It is considered reasonable to understand that the directions of magnetization are partially reversed in both hard magnetic layers. In the present invention, a hard magnetic layer included in the longitudinal hard magnetic multi-layered film is in contact with the longitudinal soft magnetic layer, and the hard magnetic layer noted above is strongly coupled with the longitudinal soft magnetic layer because of the exchange interaction therebetween. It follows that the direction of magnetization of the longitudinal soft magnetic layer is strongly affected by the magnetized state of the hard magnetic layer. Under the circumstances, the state that the direction of magnetization of the hard magnetic layer in contact with the longitudinal soft magnetic layer is partially reversed is undesirable for magnetizing the longitudinal soft magnetic layer in one direction.

Such being the situation, in the present invention, it is desirable for the coercive force of the hard magnetic layer in contact with the longitudinal soft magnetic layer to be larger than the coercive force of the other hard magnetic layer so as to suppress the reversal in the direction of magnetization of the longitudinal soft magnetic layer and the hard magnetic layer in contact with the longitudinal soft magnetic layer, thereby permitting the direction of magnetization of the other hard magnetic layer to be reversed preferentially.

In this case, it is desirable for the difference in coercive force between the hard magnetic layer in contact with the longitudinal soft magnetic layer and the other hard magnetic layer to be larger than about 1 kOe. If the difference in coercive force noted above is smaller than 1 kOe, partly reversal in the direction of magnetization in the soft magnetic layer and hard magnetic layer tends to be caused.

Figure 4:
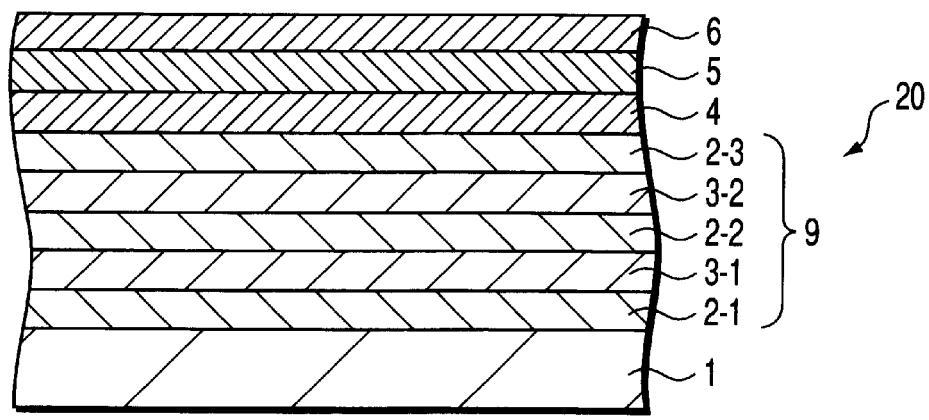
FIG. 4 is a cross-sectional view showing another example in the constitution of a magnetic recording medium of the present invention.

FIG. 4 is a cross-sectional view showing another example of the construction of a magnetic recording medium of the present invention. As shown in the drawing, the magnetic recording medium 20 is substantially equal in construction to the magnetic recording medium shown in FIG. 1, except that a nonmagnetic layer 3-2 and a third hard magnetic layer 2-3 are further arranged between the second hard magnetic layer 2-2 and the longitudinal soft magnetic layer 4 in the magnetic recording medium 20 shown in FIG. 4.

Where an even number of hard magnetic layers are included in the hard magnetic multi-layered film, it is desirable to increase the coercive force of only the hard magnetic layer in contact with the longitudinal soft magnetic layer. However, where an odd number of hard magnetic layers are included in the hard magnetic multi-layered film, it is possible to make these hard magnetic layers approximately equal to each other in coercive force. Where the magnetic recording medium includes three hard magnetic layers 2-1, 2-2 and 2-3 as shown in FIG. 4, the interaction is exerted from the upper and lower hard magnetic layers 2-1 and 2-3 to the intermediate second hard magnetic layer 2-2, though the interaction is exerted from the second hard magnetic layer 2-2 alone to each of the first and third hard magnetic layers 2-1 and 2-3, even if these three hard magnetic layers are approximately equal to each other in magnetic characteristics. It follows that the direction of magnetization tends to be reversed preferentially in the second hard magnetic layer 2-2. Even where an odd number of hard magnetic layers are included in the hard magnetic multi-layered film, these hard magnetic layers are not equal to each other in coercive force. As described previously, it is possible to allow the hard magnetic layer in contact with the longitudinal soft magnetic layer to have the largest coercive force. The particular situation is established in principle in the case where an odd number of hard magnetic layers are included in the hard magnetic multi-layered film. However, if an excessively large number of hard magnetic layers are included in the hard magnetic multi-layered film, it is considered that the direction of magnetization of the hard magnetic layer in contact with the longitudinal soft magnetic layer is unlikely to be reversed. In view of the manufacturing process of the medium and the manufacturing cost, it is considered desirable for the hard magnetic multi-layered film to include 2 to 3 hard magnetic layers, more desirably two hard magnetic layers. In this case, it is desirable for the difference in coercive force between the hard magnetic layer having the largest coercive force and the hard magnetic layer having the smallest coercive force to fall within a range of between about 1 kOe and 2 kOe. If the difference in coercive force noted above is smaller than 1 kOe partly reversal in the direction of magnetization in the soft magnetic layer and hard magnetic layer tends to be caused.

Where the hard magnetic multi-layered film includes an odd number of hard magnetic layers and where the hard magnetic layers have the same magnitude of magnetic moment, the magnetic flux for a single hard magnetic layer is not canceled so as to the leaked. In this case, it is possible to suppress the leakage of the magnetic flux from the hard magnetic multi-layered film by changing appropriately the magnitude of the magnetic moment of each hard magnetic layer. Where, for example, the hard magnetic multi-layered film includes three hard magnetic layers, it is possible to minimize the magnetic moment of the entire hard magnetic multi-layered film by allowing the saturation magnetization of the intermediate hard magnetic layer to be twice as much as that of each of the upper and lower hard magnetic layers, or by allowing the intermediate hard magnetic layer to have a thickness twice as much as that of each of the upper and lower hard magnetic layers, with the result that the leakage of the magnetic flux can be minimized. The magnitude of the magnetic moment can be changed by, for example, changing the material constituting the magnetic layer, or by changing the component ratio of the magnetic layer.

Where the hard magnetic layers are equal to each other in composition, it is desirable to allow the sum in thickness of the odd-numbered hard magnetic layers as counted from the magnetic recording layer to be approximately equal to the sum in thickness of the even-numbered hard magnetic layers even if the hard magnetic multi-layered film includes an odd number or even number of hard magnetic layers. In this case, the magnetic moments of the entire hard magnetic layers are canceled by each other so as to minimize the leakage of the magnetic flux, thereby effectively improving the noise problem. Incidentally, it is desirable for the difference in the total thickness between the odd-numbered hard magnetic layers and the even-numbered hard magnetic layers to be 0 or near 0.

In the hard magnetic multi-layered film used in the present invention, a desirable combination of the hard magnetic layer and the nonmagnetic layer includes the combination of a Co-based alloy and Ru, V or Cr. If a Co-based alloy of a hexagonal close-packed structure is used for forming the magnetic layer, a large coercive force can be obtained. Also, in order to maintain the C-axis of the Co-based alloy formed on a nonmagnetic layer in a planar direction, it is desirable to use Ru, V or Cr for forming the nonmagnetic layer. In the case of employing the particular combination, it is possible to obtain easily the antiferromagnetic coupled state so as to obtain desired hard magnetic characteristics.

In the present invention, the thickness of the nonmagnetic layer interposed between the adjacent hard magnetic layers preferably be determined to produce the interaction with the adjacent hard magnetic layers such that the directions of magnetization of these hard magnetic layers are aligned in the antiparallel direction.

For example, in a multi-layered film including a ferromagnetic transition metal layer formed of Fe or Co and a nonmagnetic metal layer formed of, for example, V, Cr, Cu, Mo, Ru, Rh or Re, a ferromagnetic coupling and an antiferromagnetic coupling have been found to appear periodically in the thickness direction of the nonmagnetic layer. It is known in the art that, in the multi-layered film noted above, the period of the antiferromagnetic coupling or the ferromagnetic coupling of the adjacent hard magnetic layers is about 1 nm, as reported in, for example, "A. Heinlich and J. A. C. Bland, Ultrathin Magnetic Structures II, Springer-Verlag (1994)". Also, the thickness of the nonmagnetic layer in which the antiferromagnetic coupling appears first is slightly smaller than 1 nm. In this case, the strongest coupling force can be obtained. Then, the intensity of the antiferromagnetic coupling tends to be lowered with increase in the thickness of the nonmagnetic layer to about 2 nm and, then, to about 3 nm.

In the present invention, in order to suppress the leakage of the magnetic flux from the longitudinal hard magnetic layer so as to improve the noise problem, a multi-layered structure consisting of a hard magnetic layer and a nonmagnetic layer can be employed in the longitudinal hard magnetic layer so as to align the magnetization of the adjacent hard magnetic layers in an antiparallel direction. Also, depending on the thickness of the nonmagnetic layer, the adjacent hard magnetic layers can be ferromagnetically coupled. In the case of the ferromagnetic coupling, it is impossible to suppress the leakage of the magnetic flux from the entire hard magnetic layers. Therefore, the thickness of the nonmagnetic layer is set to be antiferromagnetically coupled.

As described above, the thickness of the nonmagnetic layer that permits the highest intensity of the interaction for aligning the directions of the magnetization of the adjacent hard magnetic layers included in the hard magnetic multi-layered film in an antiparallel direction, which slightly differs depending on the material, is slightly smaller than about 1 nm on the average. Where the nonmagnetic layer is formed of, for example, Ru, it is known to the art that the thickness of the nonmagnetic layer that permits increasing the interaction is about 0.8 nm. If the thickness is slightly deviated from the optimum thickness noted above, the interaction to align the directions of the magnetization in an antiparallel direction tends to be further lowered. If the thickness is further deviated from the optimum thickness, the interaction to align the directions of the magnetization in a parallel direction begins to be produced, with the result that the effects of suppressing the leakage of the magnetic flux and the noise generation are rendered insufficient. In view of the facts that the state in the bonding interface between the magnetic layer and the nonmagnetic layer differs depending on the combination of the materials and that it is difficult to ensure the thickness accuracy of ±0.1 nm on the entire substrate surface, it is necessary for the fluctuation in the thickness of the nonmagnetic layer within a certain range to be acceptable. Under the circumstances, the desirable thickness of the nonmagnetic layer included in the hard magnetic multi-layered film should be not smaller than 0.5 nm and can be smaller than 1.2 nm. If the thickness of the nonmagnetic layer falls within the range noted above, it can be considered possible to obtain the effect of suppressing the noise caused by the hard magnetic multi-layered film.

It is preferable for the hard magnetic layer to be formed of an alloy containing mainly Co, Cr and Pt. In the case of using a magnetic layer formed of the particular alloy, it is possible to control easily the easy axis, to increase the coercive force and to suppress the noise.

Figure 5:
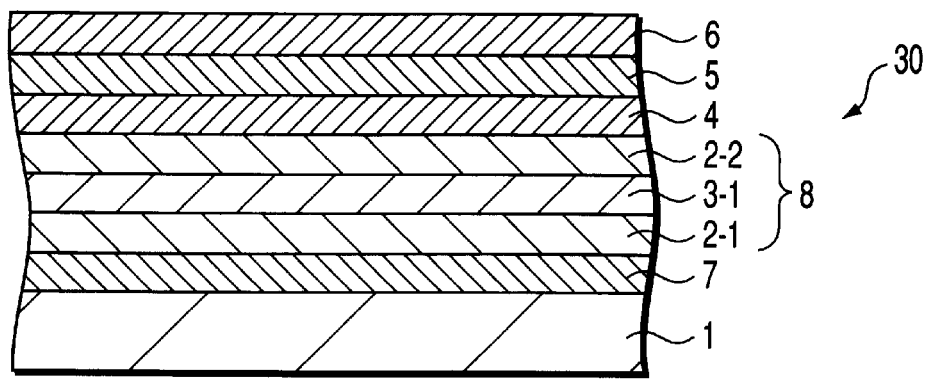
FIG. 5 is a cross-sectional view showing another example in the constitution of a magnetic recording medium of the present invention.

FIG. 5 is a cross-sectional view showing as another example the construction of a magnetic recording medium of the present invention. As shown in the drawing, the magnetic recording medium 30 shown in FIG. 5 is substantially equal in construction to the magnetic recording medium shown in FIG. 1, except that a nonmagnetic underlayer 7 is formed between the substrate 1 and the first magnetic layer 2-1 in the medium 30 shown in FIG. 5.

In the present invention, it is possible to further form a nonmagnetic underlayer between the nonmagnetic substrate and the longitudinal hard magnetic multi-layered layer in order to control the crystal orientation such that the easy axis of the longitudinal hard magnetic layer extends in the longitudinal direction, as shown in the drawing. Since the direction of easy axis of the longitudinal soft magnetic layer is longitudinal to the film surface, it is preferable for the direction of easy axis of the hard magnetic layer to be longitudinal to the film surface in order to align the directions of the axes of the film in a predetermined direction. However, since the surface of the substrate of the magnetic recording medium can be amorphous in many cases, the easy axis is not necessarily directed in longitudinal direction to the film surface if a hard magnetic layer is simply formed directly on the substrate. As a method of controlling the direction of the easy axis, it is possible to form a nonmagnetic underlayer of a different material below the magnetic layer.

In the present invention, it is preferable to form an underlayer consisting of an alloy containing mainly Cr as such a nonmagnetic underlayer. The underlayer formed of Cr is particularly effective for controlling the direction of the easy axis of the hard magnetic layer consisting essentially of an alloy containing mainly Co, Cr and Pt.

Also, in the present invention, it is preferable for the perpendicular magnetic recording layer to be formed of an alloy containing mainly at least one element selected from the group consisting of Co, Cr and Pt.

In the present invention, it is also possible to form the nonmagnetic underlayer 5 between the longitudinal soft magnetic layer 4 and the perpendicular magnetic recording layer 6, as shown in FIG. 1. Since the crystallinity in the surface region of the longitudinal soft magnetic layer differs depending on the material, it is preferable to form the nonmagnetic underlayer in order to control the crystal orientation such that the easy axis of the perpendicular magnetic recording layer extends in the perpendicular direction. By forming the nonmagnetic underlayer, it is possible to improve such as the crystal grain diameter, the medium noise and the recording resolution. Also, where the magnetic recording layer is formed of a material containing at least one element from the group consisting of Co, Cr and Pt, it is desirable for the nonmagnetic underlayer to be formed of a material containing at least one of Co, Cr and Pt and providing a nonmagnetic composition in view of the lattice mismatch. On the other hand, it is possible to obtain satisfactory magnetic characteristics and recording-reproducing characteristics in the case of using any of Pt, Pd, Rh and Ru for forming the nonmagnetic underlayer. It follows that it is possible to further improve the magnetic characteristics and the recording-reproducing characteristics by forming an alloy layer containing Co, Cr, Pt, Pd, Rh and Ru in combination between the longitudinal soft magnetic layer and the perpendicular magnetic recording layer.

As described above, a hard magnetic multi-layered film prepared by laminating ferromagnetic layers with a nonmagnetic layer interposed therebetween is formed in the present invention below the longitudinal soft magnetic layer so as to make it possible to control easily the direction of magnetization of the hard magnetic layer itself. As a result, it is possible to suppress the spike-like noise from the longitudinal soft magnetic layer to suppress the noise from the hard magnetic layer itself. It follows that it is possible to realize the magnetic recording of a high recording magnetic field intensity and a high recording resolution.

Figure 6:
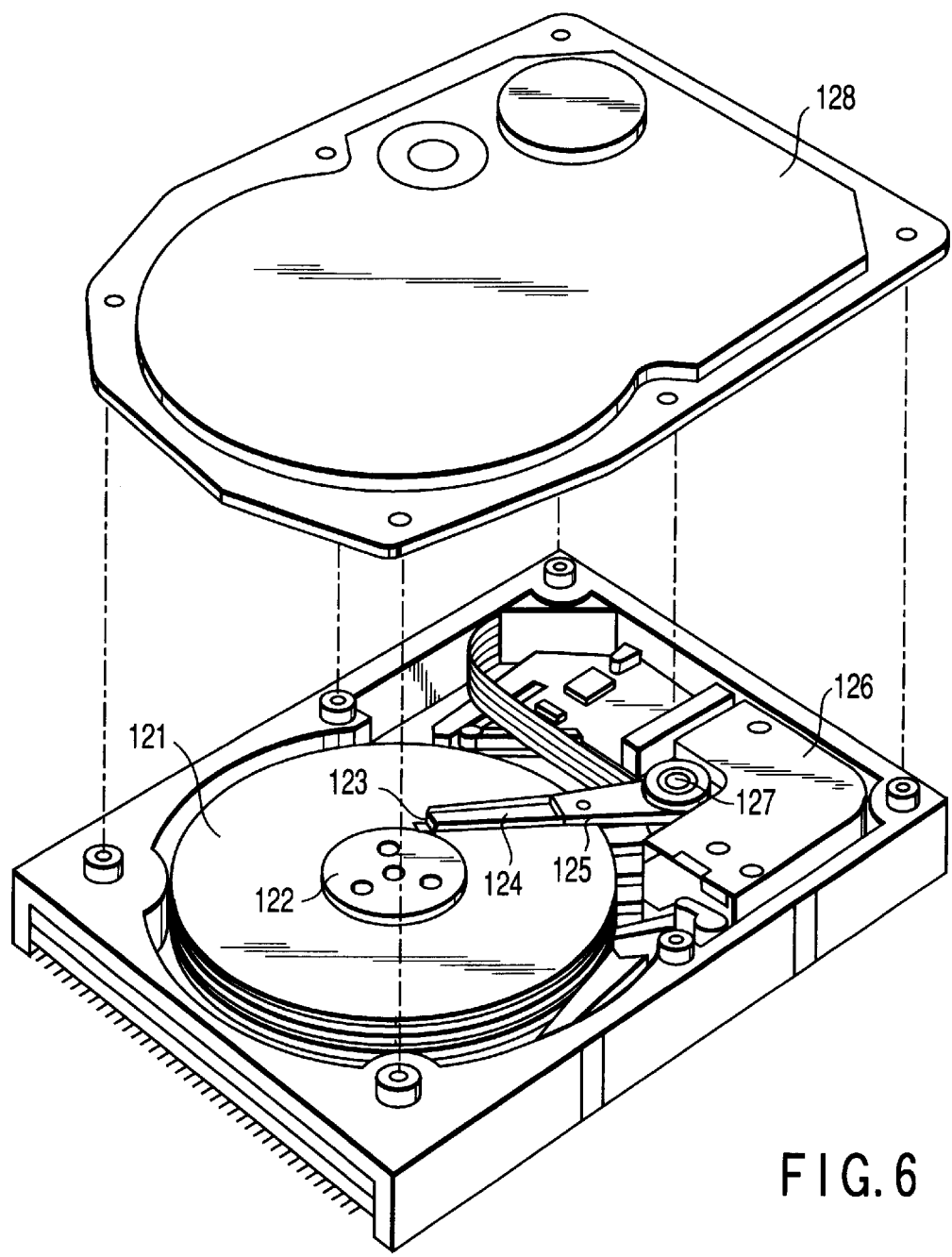
FIG. 6 is an oblique view showing in a dismantled fashion the constitution of an example of a magnetic recording-reproducing apparatus of the present invention.

FIG. 6 is an oblique view showing in a dismantled fashion a magnetic recording-reproducing apparatus of the present invention. As shown in the drawing, the magnetic recording-reproducing apparatus of the present invention comprises a magnetic disk 121 of a hard construction for recording information, and a spindle 122 mounted on the magnetic disk 121. The spindle 122 is rotated at a predetermined angular velocity by a spindle motor (not shown). A magnetic head gaining access to the magnetic disk 121 for recording-reproducing information is mounted on a slider 123, which is mounted to the tip of a suspension 124 formed of a thin plated-like leaf spring. The suspension 124 is connected to one end of an arm 125 having, for example, a bobbin portion for holding a driving coil (not shown).

A voice coil motor 126, which is a kind of a linear motor, is mounted to the other end of the arm 125. The voice coil motor 126 comprises a driving coil (not shown) wound about the bobbin portion of the arm 125 and a magnetic circuit consisting of a permanent magnet and a counter yoke arranged to have the driving coil interposed therebetween.

The arm 125 is held by upper and lower ball bearings (not shown) arranged in upper and lower portions of a stationary shaft 127 and is rocked by the voice coil motor 126. In other words, the position of the slider 123 on the magnetic disk 121 is controlled by the voice coil motor 126. Incidentally, a reference numeral 128 shown in FIG. 6 denotes a lid.

The present invention will now be described in more detail with reference to Examples of the present invention.

EXAMPLE 1

A magnetic recording medium was prepared as follows.

Figure 7:
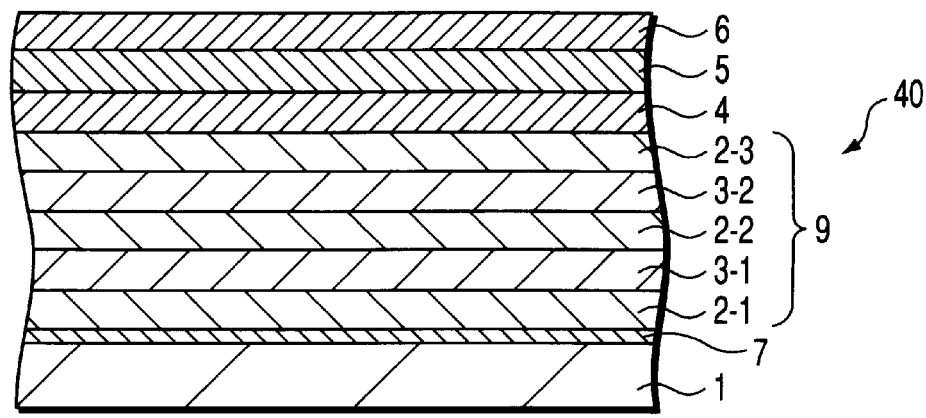
FIG. 7 is a cross-sectional view showing still another example in the constitution of a magnetic recording medium of the present invention.

FIG. 7 is a cross-sectional view showing the construction of a magnetic recording medium for Example 1.

As shown in the drawing, the magnetic recording medium 40 is substantially equal in construction to the medium shown in FIG. 1, except that a nonmagnetic underlayer 7 is further formed between the substrate 1 and the hard magnetic layer 2-1 in the magnetic recording medium 40 for Example 1.

The magnetic recording medium 40 shown in FIG. 7 was prepared as follows.

Specifically, a glass substrate 1 meeting the standard specification of a 2.5-inch magnetic disk was prepared as a nonmagnetic substrate. The glass substrate 1 was heated to 250° C., and a DC magnetron sputtering was applied to the heated glass substrate 1 under an Ar gas atmosphere having a gas pressure of 0.6 Pa so as to laminate successively various layers on the glass substrate 1, as follows.

In the first step, a CrMo alloy layer having a thickness of 40 nm was formed as the nonmagnetic underlayer 7 on the nonmagnetic substrate 1 (glass substrate).

Then, a longitudinal hard magnetic multi-layered film of a three-layer structure was formed on the nonmagnetic underlayer 7 by forming a Co—Cr—Pt hard magnetic layer 2-1 in a thickness of 10 nm with a Co—22 at %—Cr—13 at % Pt alloy used as a target, by forming a Ru nonmagnetic layer 3-1 in a thickness of 0.8 nm on the hard magnetic layer 2-1 with Ru used as a target, and further forming a hard magnetic layer 2-2 in a thickness of 10 nm on the Ru nonmagnetic layer 3-1 with a Co—18 at %—Cr—13 at % Pt alloy used as a target. Incidentally, targets of different compositions were used for forming the Co—Cr—Pt hard magnetic layers 2-1 and 2-1 so as to increase the coercive force of the hard magnetic layer 2-2 in contact with the longitudinal soft magnetic layer 4.

Further, a Co—Zr—Nb alloy layer was formed in a thickness of 100 nm as the longitudinal soft magnetic layer 4 on the Co—Cr—Pt hard magnetic layer 2-2 with a Co—5 at % Zr—10 at % Nb alloy used as a target.

Still further, a Co—Cr—Pt alloy layer was formed in a thickness of 20 nm as the nonmagnetic underlayer 5 on the longitudinal soft magnetic layer 4 with a Co—37 wt % Cr—8 at % Pt alloy of a nonmagnetic composition used as a target, followed by further forming a Co—Cr—Pt—B alloy layer in a thickness of 30 nm as a perpendicular magnetic recording layer 6 on the nonmagnetic underlayer 5 with a Co—20 at % Cr—10 at % Pt—2 at % B alloy used as a target.

Finally, a carbon layer was formed in a thickness of 10 nm as a protective layer 9.

The perpendicular magnetic recording medium 40 having the various films formed successively within a vacuum container was taken out under the air atmosphere and, then, a magnetic field of 1.2 MA/m was applied to the medium 40 radially outward by using a magnetizing apparatus utilizing an electromagnet prepared exclusively for this experiment so as to magnetize the longitudinal hard magnetic layer in a radial direction.

Figure 8:
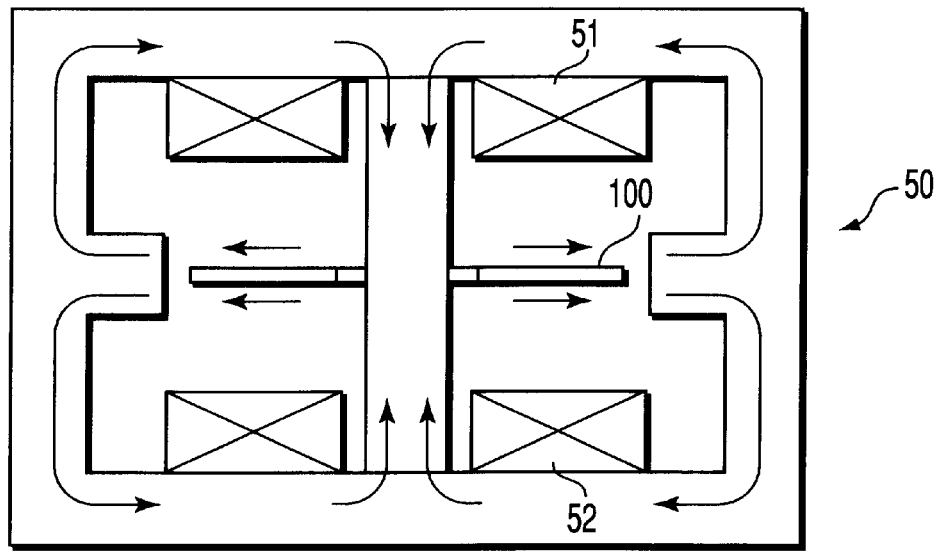
FIG. 8 schematically shows the constitution of a magnetizing apparatus used in the present invention.

FIG. 8 schematically shows the construction of a magnetizing apparatus. As shown in the drawing, the magnetizing apparatus 50 comprises a pair of coils 51, 52 arranged to face each other. If an electric current is allowed to flow through these coils 51, 52, a magnetic field is generated in a direction denoted by arrows. As shown in the drawing, a magnetic recording medium 100 is arranged in parallel between these coils 51 and 52. If an electric current is allowed to flow through these coils 51, 52, it is possible to allow a predetermined magnetic field to flow radially outward through the magnetic recording medium 100.

The recording-reproducing characteristics of perpendicular magnetic recording medium 40 thus prepared were evaluated by using a magnetic head utilizing a magnetoresistance effect. Generation of spike-like noise was not recognized at all over the entire disk. Also, the S/Nm, reproduced signal output/medium noise ratio of the recording medium, was found to be 28 dB under the linear recording density of 400 kFCI.

Incidentally, the recording-reproducing characteristics were also evaluated for the perpendicular magnetic recording medium before application of the magnetizing treatment, with the result that a plurality of spike-like noise of a magnitude substantially equal to that of the reproduced signal was observed. This clearly supports that the longitudinal hard magnetic layer was actually magnetized uniformly in the radial direction of the substrate by the magnetizing treatment so as to suppress formation of the domain wall.

COMPARATIVE EXAMPLE 1

A perpendicular magnetic recording medium was prepared as in Example 1, except that a single Co—Cr—Pt hard magnetic layer having a thickness of 20 nm was formed in place of the longitudinal hard magnetic multi-layered film by using a Co—22 at % Cr—13 at % Pt alloy as a target.

The recording-reproducing characteristics of the magnetic recording medium thus prepared were evaluated as in Example 1, with the result that generation of a spike-like noise was not recognized at all over the entire disk. Also, the S/Nm under the linear recording density of 400 kFCI was found to be 22 dB, which was clearly inferior to that for Example 1.

The experimental data clearly support that the use of the longitudinal hard magnetic layer of a multi-layered structure comprising a nonmagnetic layer interposed between the adjacent hard magnetic layers is effective for suppressing the medium noise generated from the perpendicular magnetic recording medium.

EXAMPLES 2 AND 3

A perpendicular magnetic recording medium was prepared as in Example 1, except that the thickness of the Ru nonmagnetic layer was changed to 0.5 nm or 1.2 nm.

The recording-reproducing characteristics of each of the magnetic recording media thus prepared were evaluated as in Example 1, with the result that spike-like noise was not recognized at all over the entire disk. Also, the S/Nm under the linear recording density of 400 kFCI was found to be 23 dB for each of Examples 2 and 3, which was clearly superior to that for Comparative Example 1 and inferior to that for Example 1.

It is considered reasonable to understand that, if the thickness of the Ru layer is changed to 0.5 nm or 1.2 nm, the interaction for aligning the magnetization of the adjacent hard magnetic layers in an antiparallel direction is lowered so as to provide the state close to that of the recording medium in which the longitudinal hard magnetic film does not include a nonmagnetic layer as in Comparative Example 1.

EXAMPLE 4

A perpendicular magnetic recording medium was prepared as in Example 1, except that the thickness of the Ru nonmagnetic layer included in the longitudinal hard magnetic multi-layered film was changed to 4 nm.

The recording-reproducing characteristics of the magnetic recording medium thus prepared were evaluated as in Example 1, with the result that spike-like noise was not recognized at all over the entire disk. Also, the S/Nm under the linear recording density of 400 kFCI was found to be 24 dB.

It is considered reasonable to understand that Example 4 was inferior to Example 1 in the S/Nm because the Ru layer having a thickness of 4 nm scarcely produced the effect of aligning the magnetization of the adjacent hard magnetic layers in an antiparallel direction. However, Example 4 including the longitudinal hard magnetic multi-layered film was superior to Comparative Example 1 in the S/Nm, supporting that the longitudinal hard magnetic multi-layered film is effective for suppressing noise.

COMPARATIVE EXAMPLE 2

A perpendicular magnetic recording medium was prepared as in Example 1, except that a longitudinal hard magnetic multi-layered film of a four-layer structure consisting of a Co—Cr—Pt hard magnetic layer having a thickness of 10 nm, which was equal to the Co—Cr—Pt hard magnetic layer 2-1, a Ru nonmagnetic layer having a thickness of 4 nm, a Co—Cr—Pt hard magnetic layer having a thickness of 10 nm, which was equal to the Co—Cr—Pt hard magnetic layer 2-1, and a Ru nonmagnetic layer having a thickness of 4 nm, which were laminated one upon the other in the order mentioned, was formed on the nonmagnetic underlayer 7.

The recording-reproducing characteristics of the magnetic recording medium thus prepared were evaluated as in Example 1, with the result that a plurality of spike-like noise of a magnitude substantially equal to that of the reproduced signal were observed. Therefore, it was impossible to evaluate the S/Nm properly. It is considered reasonable to understand that, since a Ru nonmagnetic layer was interposed between the hard magnetic layer included in the longitudinal hard magnetic layer and the longitudinal soft magnetic layer, the exchange interaction ceased to be produced between the two magnetic layers, with the result that a domain wall was formed in the longitudinal soft magnetic layer.

EXAMPLE 5

A perpendicular magnetic recording medium was prepared as in Example 1, except that the thickness of the second Co—Cr—Pt hard magnetic layer included in the longitudinal hard magnetic multi-layered film was set at 20 nm, said second Co—Cr—Pt hard magnetic layer being set at a high coercive force.

The recording-reproducing characteristics of the magnetic recording medium thus prepared were evaluated as in Example 1, with the result that generation of a spike-like noise was not recognized at all over the entire disk. Also, the S/Nm under the linear recording density of 400 kFCI was found to be 25 dB, which was lower than that for Example 1. The interaction to align the magnetization of the two hard magnetic layers included in the longitudinal hard magnetic multi-layered film in an antiparallel direction was certainly produced between the two hard magnetic layers noted above. However, it is considered reasonable to understand that, since the second hard magnetic layer was formed thicker than the first hard magnetic layer, the effect of mutually canceling the magnetic moment was rendered insufficient, with the result that the magnetic flux partially leaked from the second hard magnetic layer so as to increase the medium noise, compared with Example 1 in which the first and second hard magnetic layers were formed in the same thickness. The experimental data clearly support that, where the longitudinal hard magnetic multi-layered film includes an even number of hard magnetic layers, the medium noise generated from the perpendicular magnetic recording medium can be suppressed by making the magnitudes of the magnetic moments of the adjacent hard magnetic layers included in the longitudinal hard magnetic multi-layered film substantially equal to each other.

EXAMPLE 6

A perpendicular magnetic recording medium was prepared as in Example 1, except that the longitudinal hard magnetic multi-layered film was of a five-layer structure consisting of a Co—Cr—Pt hard magnetic layer having a thickness of 10 nm, which was equal to the Co—Cr—Pt hard magnetic layer 2-1, a Ru nonmagnetic layer having a thickness of 0.8 nm, a Co—Cr—Pt hard magnetic layer having a thickness of 10 nm, which was equal to the Co—Cr—Pt hard magnetic layer 2-1, a Ru nonmagnetic layer having a thickness of 0.8 nm, and a Co—Cr—Pt hard magnetic layer having a thickness of 10 nm, which was equal to the Co—Cr—Pt hard magnetic layer 2-2, which were laminated one upon the other in the order mentioned. The third Co—Cr—Pt hard magnetic layer in contact with the longitudinal soft magnetic layer was set at a high coercive force by using a target of a different composition in forming the third Co—Cr—Pt layer. The recording-reproducing characteristics of the magnetic recording medium thus prepared were evaluated as in Example 1, with the result that spike-like noise was not recognized at all over the entire disk. Also, the S/Nm under the linear recording density of 400 kFCI was found to be 26 dB, which was lower than that for Example 1. The interaction to align the magnetization of the three hard magnetic layers included in the longitudinal hard magnetic multi-layered film in an antiparallel direction was certainly produced among the three hard magnetic layers noted above. However, it is considered reasonable to understand that, since the three hard magnetic layers having substantially the same magnetic moment were included in the longitudinal hard magnetic multi-layered film, the magnetic moment of one hard magnetic layer is not canceled so as to cause leakage of the magnetic flux, leading to the increase in the medium noise, compared with Example 1 in which two hard magnetic layers were included in the longitudinal hard magnetic multi-layered film.

EXAMPLE 7

A perpendicular magnetic recording medium was prepared as in Example 1, except that the two Co—Cr—Pt hard magnetic layers were made substantially equal to each other in the magnitude of the coercive force.

The recording-reproducing characteristics of the magnetic recording medium thus prepared were evaluated as in Example 1, with the result that spike-like noise similar to the reproduced signal was somewhat observed over the entire disk. It is considered reasonable to understand that, since the two hard magnetic layers included in the longitudinal hard magnetic multi-layered film were substantially equal to each other in the magnetic characteristics, the direction of magnetization of only one of the two hard magnetic layers failed to be preferentially reversed after the magnetizing treatment, and the direction of magnetization of the two hard magnetic layers was partially reversed so as to form a domain wall within the longitudinal soft magnetic layer. The experimental data clearly support that generation of spike-like noise from the perpendicular magnetic recording medium can be suppressed by making the coercive force of the hard magnetic layer in contact with the longitudinal soft magnetic layer larger than the coercive force of the other hard magnetic layer included in the longitudinal hard magnetic multi-layered film.

EXAMPLE 8

A perpendicular magnetic recording medium including a longitudinal hard magnetic multi-layered film of a five-layer structure was prepared as in Example 6, except that the thickness of each of the three Co—Cr—Pt hard magnetic layers was set at 10 nm, which was equal to the thickness of the Co—Cr—Pt hard magnetic layer 2-1. The recording-reproducing characteristics of the magnetic recording medium thus prepared were evaluated as in Example 1, with the result that the S/Nm was found to be 26 dB under the linear recording density of 400 kFCI, which was lower than that for Example 1.

It is considered reasonable to understand that the S/Nm was lowered because the medium noise was increased, compared with Example 1 in which the longitudinal hard magnetic multi-layered film included two hard magnetic layers. Incidentally, in Example 8, the coercive force of the Co—Cr—Pt hard magnetic layer in contact with the longitudinal soft magnetic layer was made larger than that of each of the other hard magnetic layers unlike the Co—Cr—Pt hard magnetic layers used in the Examples described previously. In spite of the particular construction, spike-like noise was not generated in Example 8. It is considered reasonable to understand that the interaction from both the first and third hard magnetic layers is exerted on the intermediate second hard magnetic layer, though the interaction from the intermediate second hard magnetic layer alone is exerted on each the first and third hard magnetic layers, with the result that the direction of magnetization of the second hard magnetic layer is preferentially reversed so as to suppress the spike-like noise. In conclusion, the experimental data support that, where an odd number of hard magnetic layers are included in the longitudinal hard magnetic multi-layered film, the medium noise from the perpendicular magnetic recording medium can be suppressed even if the hard magnetic layers have substantially the same coercive force.

EXAMPLE 9

A perpendicular magnetic recording medium was prepared as in Example 1, except that V was used in place of Ru for forming the nonmagnetic layer. The recording-reproducing characteristics of the magnetic recording medium thus prepared were evaluated, with the result that the S/Nm under the linear recording density of 400 kFCI was found to be 27 dB, which was satisfactory, though the S/Nm value was slightly lower than that for Example 1. It follows that the medium noise of the perpendicular magnetic recording medium can be suppressed even in the case of using V in place of Ru for forming the nonmagnetic layer included in the longitudinal hard magnetic multi-layered film.

Incidentally, it is considered reasonable to understand that the S/Nm was slightly lower than that for Example 1 because the exchange interaction produced between the adjacent hard magnetic layers with the Ru layer interposed therebetween is stronger than the exchange interaction produced between the adjacent hard magnetic layers with the V layer interposed therebetween.

EXAMPLE 10

A perpendicular magnetic recording medium was prepared as in Example 1, except that Cr was used in place of Ru for forming the nonmagnetic layer. The recording-reproducing characteristics of the magnetic recording medium thus prepared were evaluated, with the result that the S/Nm under the linear recording density of 400 kFCI was found to be 27 dB, which was satisfactory, though the S/Nm value was slightly lower than that for Example 1. It follows that the medium noise of the perpendicular magnetic recording medium can be suppressed even in the case of using Cr in place of Ru for forming the nonmagnetic layer included in the longitudinal hard magnetic multi-layered film.

Incidentally, it is considered reasonable to understand that the S/Nm was slightly lower than that for Example 1 because the exchange interaction produced between the adjacent hard magnetic layers with the Ru layer interposed therebetween is stronger than the exchange interaction produced between the adjacent hard magnetic layers with the Cr layer interposed therebetween.

In each of Examples 9 and 10, a Co—Cr—Pt alloy was used for forming the hard magnetic layer, and Ru, V or Cr was used for forming the nonmagnetic layer. However, it is also possible to use the ferromagnetic material and the nonmagnetic material other than those noted above. It is possible to obtain the similar effect by selecting the thickness of the nonmagnetic layer such that an antiferromagnetic exchange interaction is produced between the adjacent hard magnetic layers. However, it is desirable to use Ru, V or Cr for forming the nonmagnetic layer because the nonmagnetic layer formed of the particular element noted above permits effectively suppressing the medium noise.

EXAMPLE 11

A perpendicular magnetic recording medium was prepared as in Example 1, except that a Cr—Mo alloy nonmagnetic underlayer was not formed below the longitudinal hard magnetic multi-layered film.

The recording-reproducing characteristics of the magnetic recording medium thus prepared were evaluated, with the result that spike-like noise having a magnitude substantially equal to that of the reproduced signal was somewhat observed. It is considered reasonable to understand that, since the Co—Cr—Pt hard magnetic layer of a hexagonal close-packed structure was formed directly on the amorphous substrate, the easy axis of the hard magnetic layer was oriented mainly in a direction perpendicular to the film surface and partly at random, resulting in failure to align uniformly the directions of magnetization of the longitudinal soft magnetic layer radially outward, thereby forming the domain wall.

What should be noted is that the easy axis of the longitudinal hard magnetic multi-layered film can be controlled in the longitudinal direction by forming a nonmagnetic underlayer between the nonmagnetic substrate and the longitudinal hard magnetic multi-layered film, with the result that it is possible to suppress the medium noise from the perpendicular magnetic recording medium.

EXAMPLE 12

A perpendicular magnetic recording medium was prepared as in Example 1, except that the nonmagnetic underlayer made of a Co—Cr—Pt alloy was not formed below the perpendicular magnetic recording layer.

The recording-reproducing characteristics of the magnetic recording medium thus prepared were evaluated, with the result that the S/Nm under the linear recording density of 400 kFCI was found to be 24 dB, which was lower than that for Example 1. It is considered reasonable to understand that, since the Co—Cr—Pt—B perpendicular magnetic recording layer was formed directly on the amorphous Co—Zr—Nb longitudinal soft magnetic layer, the perpendicular orientation of the perpendicular magnetic recording layer was not controlled sufficiently and the crystal grains were not sufficiently diminished, leading to the S/Nm lower than that for Example 1. It follows that the recording-reproducing characteristics of the perpendicular magnetic medium such as the capability of suppressing medium noise and the recording resolution can be improved by forming a nonmagnetic underlayer between the longitudinal hard magnetic layer and the perpendicular magnetic recording layer.

EXAMPLE 13

A perpendicular magnetic recording medium was prepared as in Example 1, except that a Co—Pt—CrO layer having a thickness of 30 nm was formed in place of the Co—Cr—Pt—B layer as the perpendicular magnetic recording layer. The Co—Pt—CrO layer was formed under the conditions differing the conditions for forming the other layers. Specifically, the Co—Pt—CrO layer was formed by the sputtering method under a high pressure Ar atmosphere containing traces of $O_2$ with a Co—Pt—Cr alloy used as a target.

The recording-reproducing characteristics of the magnetic recording medium thus prepared were evaluated, with the result that the S/Nm under a linear recording density of 400 kFCI was found to be 27 dB. The value of 27 dB, which was slightly lower than the S/Nm for Example 1, was satisfactory. It follows that the medium noise from the perpendicular magnetic recording medium can be suppressed even in the case of using a magnetic recording layer differing in the material and the fine structure from the perpendicular magnetic recording layer made of a Co—Cr—Pt—B alloy. To be more specific, the medium noise can be suppressed even in the case of using a perpendicular magnetic recording layer made of a Co—Pt—CrO alloy.

EXAMPLE 14

A perpendicular magnetic recording medium was prepared as in Example 1, except that Pd was used in place of the Co—Cr—Pt alloy for forming the nonmagnetic underlayer positioned below the perpendicular magnetic recording layer.

The recording-reproducing characteristics of the magnetic recording medium thus prepared were evaluated, with the result that the S/Nm under a linear recording density of 400 kFCI was found to be 27 dB. The value of 27 dB, which was slightly lower than the S/Nm for Example 1, was satisfactory. It follows that the medium noise from the perpendicular magnetic recording medium can be suppressed even in the case of using Pd for forming the nonmagnetic underlayer.

EXAMPLE 15

A perpendicular magnetic recording medium was prepared as in Example 1, except that Rh was used in place of the Co—Cr—Pt alloy for forming the nonmagnetic underlayer positioned below the perpendicular magnetic recording layer.

The recording-reproducing characteristics of the magnetic recording medium thus prepared were evaluated, with the result that the S/Nm under a linear recording density of 400 kFCI was found to be 26 dB. The value of 26 dB, which was slightly lower than the S/Nm for Example 1, was satisfactory. It follows that the medium noise from the perpendicular magnetic recording medium can be suppressed even in the case of using Rh in place of the Co—Cr—Pt alloy for forming the nonmagnetic underlayer.

EXAMPLE 16

A perpendicular magnetic recording medium was prepared as in Example 1, except that Ru was used in place of the Co—Cr—Pt alloy for forming the nonmagnetic underlayer positioned below the perpendicular magnetic recording layer.

The recording-reproducing characteristics of the magnetic recording medium thus prepared were evaluated, with the result that the S/Nm under a linear recording density of 400 kFCI was found to be 28 dB. The S/Nm was satisfactory as in Example 1. It follows that the medium noise from the perpendicular magnetic recording medium can be suppressed even in the case of using Ru in place of the Co—Cr—Pt alloy for forming the nonmagnetic underlayer.

In each of the Examples described above, a glass substrate was used as the nonmagnetic substrate. Alternatively, it is also possible to use an Al-based alloy, a Si single crystal substrate having the surface oxidized, or a substrate having the surface plated with Ni—P, with substantially the same effect. Also, the various layers were formed on the nonmagnetic substrate by the sputtering method in each of the Examples described above. Alternatively, it is also possible to employ another method such a vacuum vapor deposition method in place of the sputtering method, with substantially the same effect.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A perpendicular magnetic recording medium, comprising:
   a nonmagnetic substrate;
   a longitudinal hard magnetic multi-layered film arranged on the nonmagnetic substrate, including at least, a nonmagnetic intermediate layer and two hard magnetic layers;
   a longitudinal soft magnetic layer formed on the longitudinal hard magnetic multi-layered film; and a perpendicular magnetic recording layer formed on the longitudinal soft magnetic layer, wherein the nonmagnetic intermediate layer and the two hard magnetic layers are laminated one hard magnetic layer upon the other hard magnetic layer in order from on the nonmagnetic substrate toward the longitudinal soft magnetic layer, with the nonmagnetic intermediate layer interposed between the two hard magnetic layers wherein said nonmagnetic layer has sufficient thickness to align the directions of magnetization of the two hard magnetic layers with the nonmagnetic layer interposed therebetween to be antiparallel.

2. A perpendicular magnetic recording medium according to claim 1, wherein said nonmagnetic substrate is disk-shaped, and the hard magnetic layer in contact with said longitudinal soft magnetic layer is magnetized in the radial direction of the disk-shaped substrate.

3. A perpendicular magnetic recording medium according to claim 1, wherein the hard magnetic layers included in the longitudinal hard magnetic multi-layered film with the nonmagnetic layer interposed therebetween have about the same magnetic moment.

4. A perpendicular magnetic recording medium according to claim 1, wherein the sum of the magnetic moment of the hard magnetic layers included in said longitudinal hard magnetic multi-layered film and magnetized radially outward is substantially equal to the sum of the magnetic moment of the hard magnetic layers included in said longitudinal hard magnetic multi-layered film and magnetized radially inward.

5. A perpendicular magnetic recording medium according to claim 1, wherein the sum of the thicknesses of the hard magnetic layers included in said longitudinal hard magnetic multi-layered film and magnetized radially outward is substantially equal to the sum of the thicknesses of the hard magnetic layers included in said longitudinal hard magnetic multi-layered film and magnetized radially inward.

6. A perpendicular magnetic recording medium according to claim 1, wherein the coercive force of the hard magnetic layer in contact with said longitudinal soft magnetic layer is larger than the coercive force of the other hard magnetic layer.

7. A perpendicular magnetic recording medium according to claim 1, wherein said nonmagnetic intermediate layer is formed essentially of at least one element selected from the group consisting of ruthenium, vanadium and chromium.

8. A perpendicular magnetic recording medium according to claim 7, wherein said nonmagnetic intermediate layer is formed essentially of ruthenium and has a thickness not smaller than 0.5 nm and smaller than 1.2 nm.

9. A perpendicular magnetic recording medium according to claim 1, wherein said hard magnetic layer is formed essentially of an alloy containing mainly cobalt, chromium and platinum.

10. A perpendicular magnetic recording medium according to claim 1, wherein said hard magnetic layer has a thickness not larger than 10 nm.

11. A perpendicular magnetic recording medium according to claim 1, wherein a nonmagnetic underlayer made of an alloy containing mainly chromium is further formed between said nonmagnetic substrate and said longitudinal hard magnetic multi-layered film.

12. A perpendicular magnetic recording medium according to claim 1, wherein said perpendicular magnetic recording layer is formed essentially of an alloy containing mainly at least one element selected from the group consisting of cobalt, chromium and platinum.

13. A perpendicular magnetic recording medium according to claim 1, wherein a nonmagnetic underlayer made essentially of an alloy containing as a main component at least one element selected from the group consisting of cobalt, chromium, platinum, rhodium, and ruthenium is further formed between said longitudinal soft magnetic layer and said perpendicular magnetic recording layer.

14. A perpendicular magnetic recording medium according to claim 1, wherein said longitudinal hard magnetic multi-layered film includes two hard magnetic layers.

15. A magnetic recording-reproducing apparatus, comprising:

a perpendicular magnetic recording-reproducing medium including a nonmagnetic substrate, a longitudinal hard magnetic multi-layered film arranged on the nonmagnetic substrate, a longitudinal soft magnetic layer formed on the longitudinal hard magnetic multi-layered film, and a perpendicular magnetic recording layer formed on the longitudinal soft magnetic layer;

a driving mechanism to support and rotate said perpendicular magnetic recording-reproducing medium;

a magnetic head equipped with an element which serves to record information in said perpendicular magnetic recording medium and with an element to reproduce the recorded information; and a carriage assembly which supports said magnetic head such that the magnetic head is movable relative to said perpendicular magnetic recording medium;

wherein the lingitudinal hard magnetic multi-layered film includes at least a nonmagnetic intermediate layer and two hard magnetic layers which are laminated one hard magnetic layer upon the other hard magnetic layer in order from on the nonmagnetic substrate toward the longitudinal soft magnetic layer, with the nonmagnetic intermediate layer interposed between the two hard magnetic layers wherein said nonmagnetic layer has sufficient thickness to align the directions of magnetization of the two hard magnetic layers with the nonmagnetic layer interposed therebetween to be antiparallel.

16. A magnetic recording-reproducing apparatus according to claim 15, wherein said nonmagnetic substrate is disk-shaped, and the hard magnetic layer in contact with said longitudinal soft magnetic layer is magnetized in the radial direction of the disk-shaped substrate.

17. A magnetic recording-reproducing apparatus according to claim 15, wherein the hard magnetic layers included in the longitudinal hard magnetic multi-layered film with the nonmagnetic layer interposed therebetween have about the same magnetic moment.

18. A magnetic recording-reproducing apparatus according to claim 15, wherein the sum of the magnetic moments of the hard magnetic layers included in said longitudinal hard magnetic multi-layered film and magnetized radially outward is substantially equal to the sum of the magnetic moments of the hard magnetic layers included in said longitudinal hard magnetic multi-layered film and magnetized radially inward.

19. A magnetic recording-reproducing apparatus according to claim 15, wherein the sum of the thicknesses of the hard magnetic layers included in said longitudinal hard magnetic multi-layered film and magnetized radially outward is substantially equal to the sum of the thicknesses of the hard magnetic layers included in said longitudinal hard magnetic multi-layered film and magnetized radially inward.

20. A magnetic recording-reproducing apparatus according to claim 15, wherein the coercive force of the hard magnetic layer in contact with said longitudinal soft magnetic layer is larger than the coercive force of the other hard magnetic layer.

21. A magnetic recording-reproducing apparatus according to claim 15, wherein said nonmagnetic intermediate layer is formed essentially of at least one element selected from the group consisting of ruthenium, vanadium and chromium.

22. A magnetic recording-reproducing apparatus according to claim 21, wherein said nonmagnetic intermediate layer is formed essentially of ruthenium and has a thickness not smaller than 0.5 nm and smaller than 1.2 nm.

23. A magnetic recording-reproducing apparatus according to claim 15, wherein said hard magnetic layer is formed essentially of an alloy containing mainly cobalt, chromium and platinum.

24. A magnetic recording-reproducing apparatus according to claim 15, wherein said hard magnetic layer has a thickness not larger than 10 nm.

25. A magnetic recording-reproducing apparatus according to claim 15, wherein a nonmagnetic underlayer made of an alloy containing mainly chromium is further formed between said nonmagnetic substrate and said longitudinal hard magnetic multi-layered film.

26. A magnetic recording-reproducing apparatus according to claim 15, wherein said perpendicular magnetic recording layer is formed essentially of an alloy containing mainly at least one element selected from the group consisting of cobalt, chromium and platinum.

27. A magnetic recording-reproducing apparatus according to claim 15, wherein a nonmagnetic underlayer made essentially of an alloy containing as a main component at least one element selected from the group consisting of cobalt, chromium, platinum, rhodium, and ruthenium is further formed between said longitudinal soft magnetic layer and said perpendicular magnetic recording layer.

28. A magnetic recording-reproducing apparatus according to claim 15, wherein said longitudinal hard magnetic multi-layered film includes two hard magnetic layers.

* * * * *